(12) United States Patent
Lin et al.

(10) Patent No.: US 8,278,803 B2
(45) Date of Patent: Oct. 2, 2012

(54) MOTOR END CAP POSITIONING ELEMENT FOR MAINTAINING ROTOR-STATOR CONCENTRICITY

(75) Inventors: Ted T. Lin, Saratoga, CA (US); Richard L. Badgerow, Watsonville, CA (US)

(73) Assignee: Lin Engineering, Morgan Hill, CA (US)

( * ) Notice: Subject to any disclaimer, the term of this patent is extended or adjusted under 35 U.S.C. 154(b) by 0 days.

(21) Appl. No.: 12/541,723

(22) Filed: Aug. 14, 2009

(65) Prior Publication Data

US 2011/0037352 A1 Feb. 17, 2011

(51) Int. Cl.
H02K 37/04 (2006.01)
(52) U.S. Cl. ............................ 310/402; 310/89; 310/411
(58) Field of Classification Search .................. 310/89, 310/90, 215, 402, 406–409, 411
See application file for complete search history.

(56) References Cited

U.S. PATENT DOCUMENTS

| | | | |
|---|---|---|---|
| 3,161,794 A | 12/1964 | Lindgren | |
| 3,612,728 A | 10/1971 | Fulmer | |
| 3,717,779 A * | 2/1973 | Hallerback | 310/91 |
| 3,742,595 A * | 7/1973 | Lykes | 29/596 |
| 3,873,861 A * | 3/1975 | Halm | 310/43 |
| 3,979,822 A | 9/1976 | Halm | |
| 4,243,899 A | 1/1981 | Jaffe | |
| 4,505,031 A | 3/1985 | Colwell et al. | |
| 4,590,668 A | 5/1986 | Peachee, Jr. | |
| 4,682,066 A | 7/1987 | Abbratozzato et al. | |
| 4,752,708 A | 6/1988 | Jager et al. | |
| 4,801,833 A | 1/1989 | Dye | |
| 4,857,789 A | 8/1989 | Suimon | |
| 4,955,128 A * | 9/1990 | Sogabe et al. | 29/596 |
| 5,008,572 A | 4/1991 | Marshall et al. | |
| 5,075,585 A | 12/1991 | Teruyama et al. | |
| 5,117,138 A | 5/1992 | Trian | |
| 5,166,565 A * | 11/1992 | Katsuzawa et al. | 310/90 |
| 5,218,256 A | 6/1993 | Umezawa et al. | |
| 5,291,649 A | 3/1994 | Lombardi et al. | |
| 5,945,759 A * | 8/1999 | Tanaka et al. | 310/90 |
| 6,161,274 A | 12/2000 | Stark et al. | |
| 6,249,066 B1 * | 6/2001 | Ikegami et al. | 310/49.23 |
| 6,629,356 B2 | 10/2003 | Wang et al. | |
| 6,661,140 B2 | 12/2003 | Agnes et al. | |
| 6,672,402 B2 | 1/2004 | Ortt et al. | |
| 6,772,502 B2 | 8/2004 | Scott | |
| 7,095,153 B1 * | 8/2006 | Shoykhet | 310/260 |
| 7,131,182 B2 | 11/2006 | Yeh et al. | |
| 2005/0046305 A1 | 3/2005 | Matsushita | |
| 2007/0210666 A1 | 9/2007 | Yoshida et al. | |

* cited by examiner

Primary Examiner — Dang Le
(74) Attorney, Agent, or Firm — Schneck & Schneck; Thomas Schneck; Mark Protsik

(57) ABSTRACT

A motor is provided with a set of end cap guides on the ends of a stator winding assembly to pilot the placement of end caps into the correct placement relative to the stator winding assembly so that the rotor assembly is maintained concentric with the stator. The end cap guides may be rings fitting within the winding insulators on the ends of the stator stack or may be integrated as guide segments with the winding insulators to outline an interrupted cylindrical inner surface coinciding with the inner diameter of the stator winding assembly. The guides allow proper positioning of the rotor assembly without increasing the stator stack length.

4 Claims, 7 Drawing Sheets

Fig. 1 *(Prior Art)*

Fig. 5
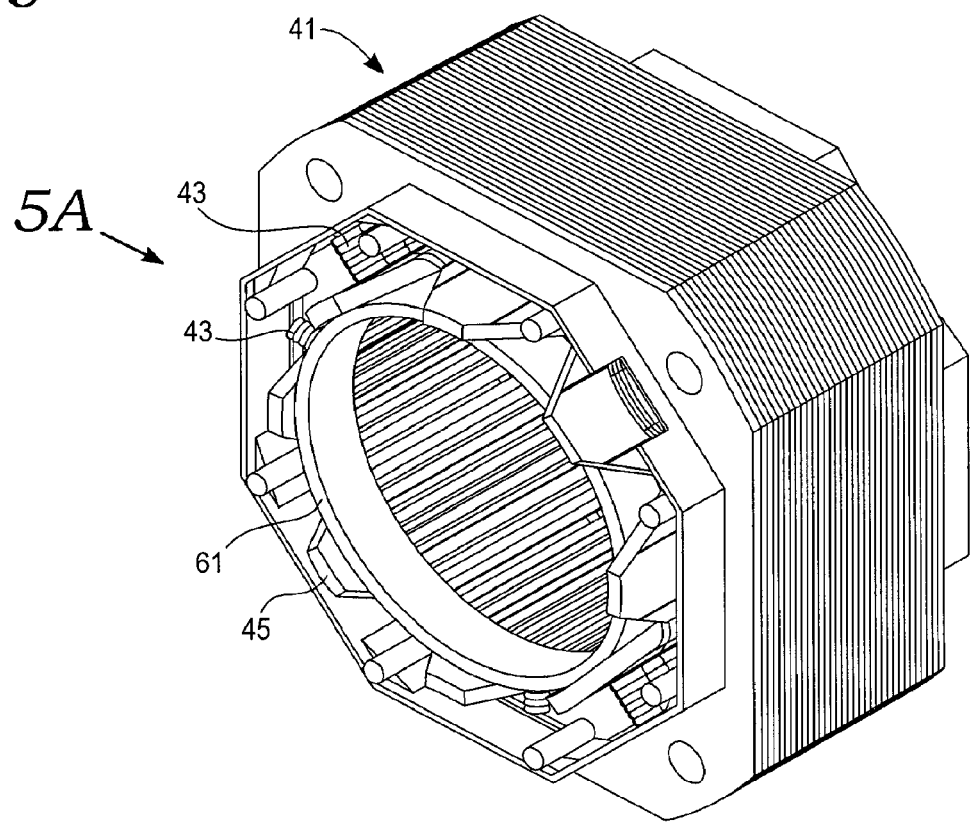
5A
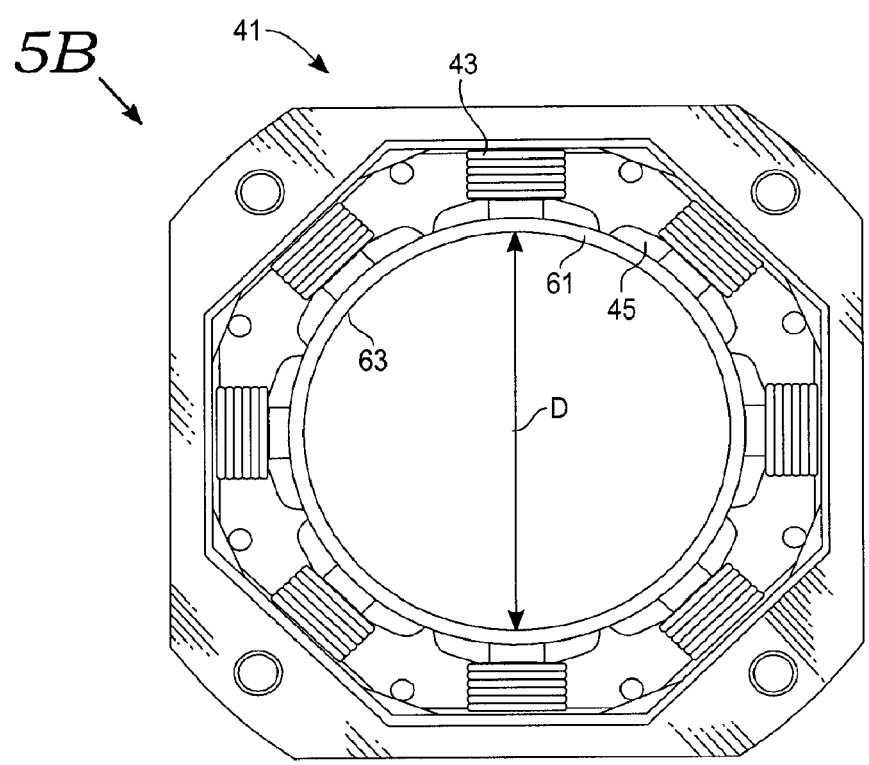
5B

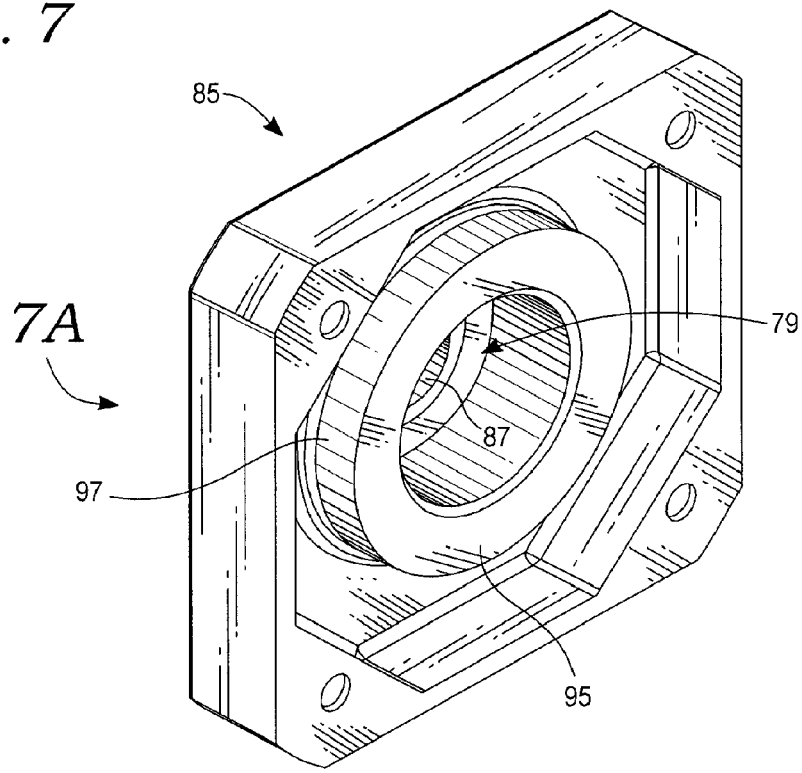
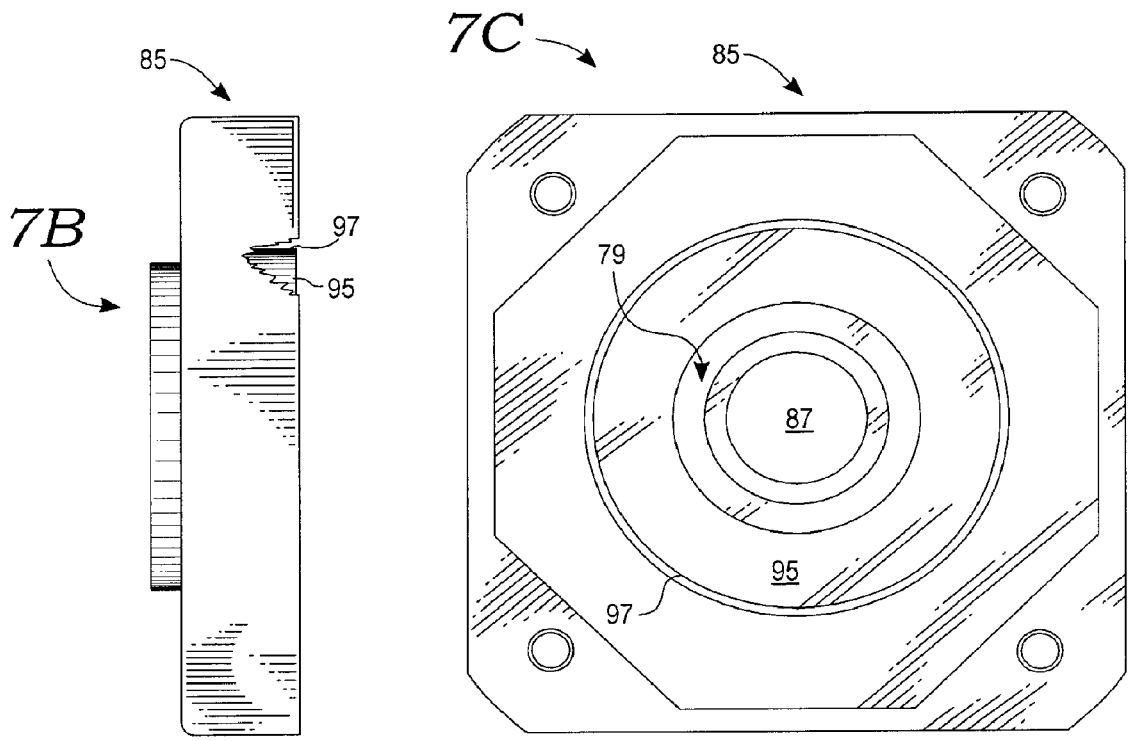

Fig. 8
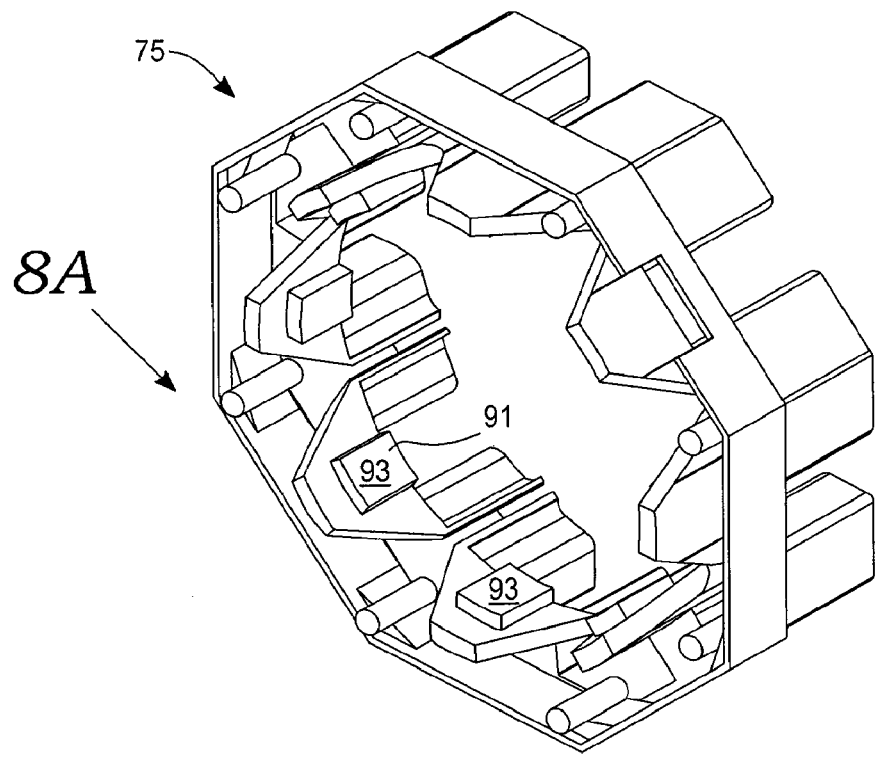
8A
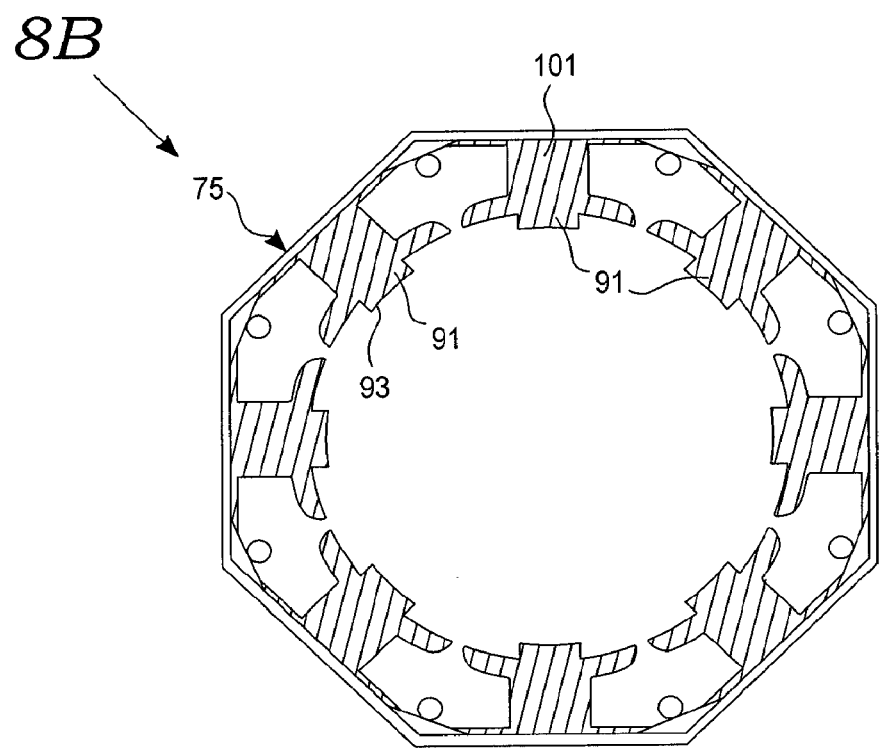
8B

MOTOR END CAP POSITIONING ELEMENT FOR MAINTAINING ROTOR-STATOR CONCENTRICITY

TECHNICAL FIELD

The present invention relates to manufacture and assembly of rotary dynamoelectric machines (electric motors or generators), and in particular relates to housings, covers, bearing shields, end plates, or other structural mounting arrangements that are specially adapted to facilitate the proper centering and balancing, including axial alignment, of a rotor within a stator.

BACKGROUND ART

Assembling a motor so that its rotor and stator maintain a concentric relationship is essential to smooth and efficient operation of the motor. End caps of the motor casing, also referred to sometimes as end plates or bearing shields, seat the rotor assembly (rotor, drive shaft and bearings), so the mounting of the end caps is important for establishing the proper centering and alignment of the rotor within the stator.

Piloting the end cap to the stator's inner diameter is commonly used in the industry today to establish and maintain concentricity of the rotor relative to the stator. This typical motor construction is illustrated in FIGS. 1 and 2. A stator winding assembly 11 comprises conductive windings 13, which define a set of coils for some predefined number of electromagnetic poles, all wound around an annular core or frame. The stator winding assembly 11 has a stator stack length $L_s$ and is also characterized by an inner diameter $ID_s$ of a central region into which a rotor assembly fits. An insulator 15 is used on each end of the stator core to support the windings 13 and to prevent the stator's windings from shorting to the core. A rotor assembly includes a rotor stack 17 of permanent magnets with a rotor stack length $L_{rp}$, an axial drive shaft 19, and bearings 21 and 22. The rotor assembly has an outer diameter that is slightly less than the inner diameter of the stator assembly so that the rotor fits within the stator with a small air gap 23 therebetween that allows the rotor to freely rotate on its bearings 21 about its drive axis A. Two end caps 25 and 26 are provided (end cap 25 is seen in FIGS. 2A-C) that fit over the ends of the stator winding assembly 11. There is a central opening 27 in at least one of the end caps 25 (or openings 27 and 28 in both end caps 25 and 26 as shown here) through which the drive shaft 19 projects. A space 29 is also provided in the end caps 25 and 26 to seat the rotor assembly at its bearings 21 and 22. The stator stack length $L_s$ is slightly larger on both ends than the corresponding rotor stack length $L_{rp}$ so that a surface 31 of the end caps 25 and 26 can pilot into the resulting space and fit snuggly against the inner diameter of the stator winding assembly. This guarantees that the rotor assembly will be in a concentric position relative to the stator. Once a position, the end caps 25 and 26 are often secured tightly to the stator core using screws.

However, because the stator stack must be slightly longer than the rotor to provide the stator surfaces needed to guide the end caps into position, a disadvantage is that the motor length is necessarily increased for a given torque, or seen another way, that torque is reduced for a given motor length. It would be desirable if the end caps could be positioned precisely without increasing the stator stack length.

SUMMARY DISCLOSURE

A set of guides is provided that have dimensions coinciding with the inner diameter of the stator winding assembly. These guides are attached at both ends of the stator and serve to pilot the placement of the end caps without lengthening the stator relative to the rotor. In one embodiment, the guides are a pair of rings with the same inner diameter as and attached concentrically to the stator winding assembly. In another embodiment, the guides are integrated with the winding insulator for the stator assembly. The guides outline a cylindrical inner surface with an inner diameter equal to that of the stator winding assembly, but are interrupted circumferentially by a series of lengthwise slots between the stator pole locations of the insulator to allow for winding needle passage.

BRIEF DESCRIPTION OF THE DRAWINGS

FIGS. 5A and 5B are perspective and end views, respectively, of a stator winding assembly for the motor embodiment of FIG. 3.

FIGS. 7A-7C are perspective, side and plan views, respectively, of an end cap for the motors in FIGS. 3 and 6.

FIGS. 8A and 8B are perspective and end views, respectively, of a winding insulator with integrated end cap guides for the motor embodiment of FIG. 6.

DETAILED DESCRIPTION

Figure 3:
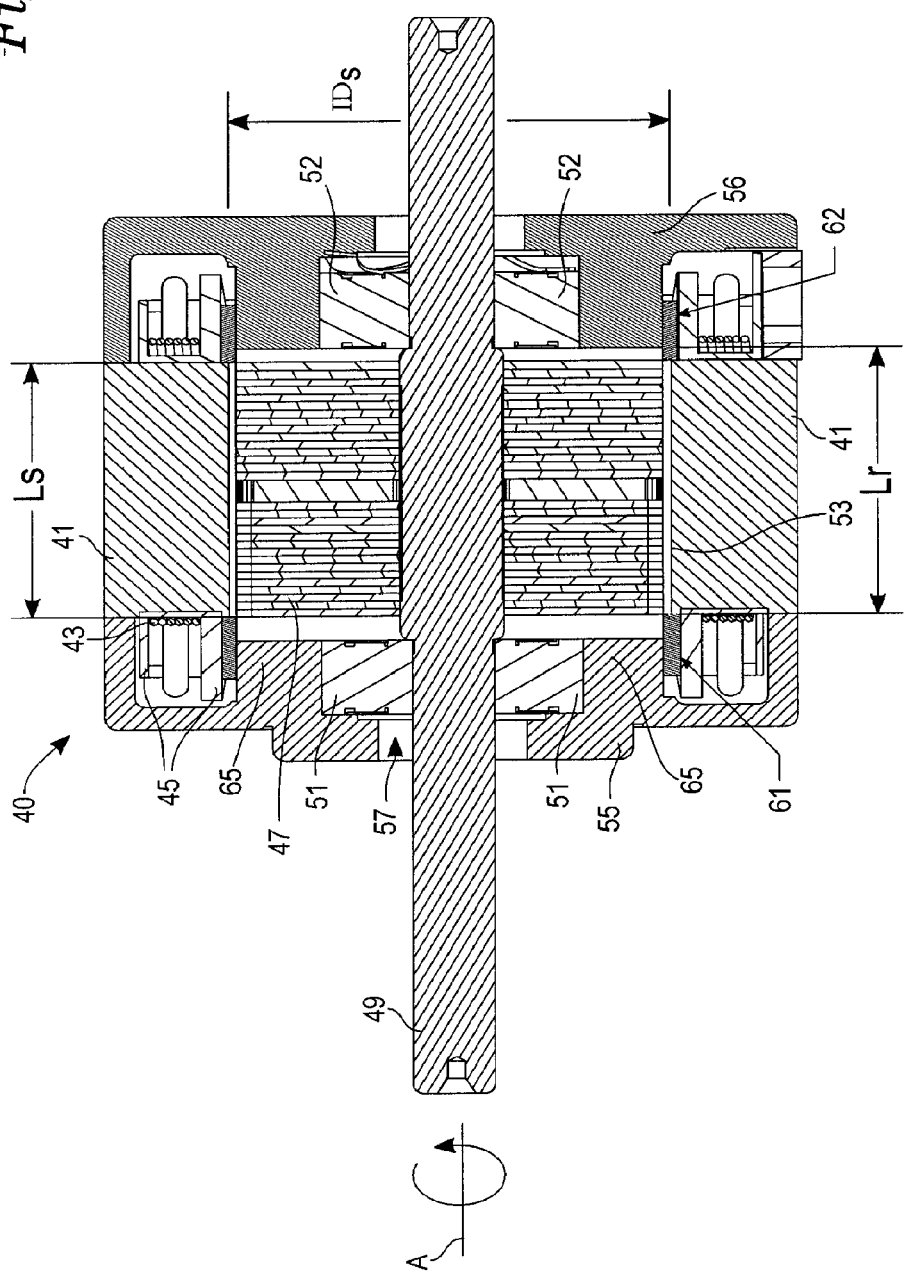
FIG. 3 is a side sectional view of a motor according to a first embodiment of the invention.

With reference to FIG. 3, a first embodiment of a motor 40 in accord with the present invention includes a stator winding assembly 41 with conductive windings 43, which define a set of coils for some predefined number of electromagnetic poles, all wound around a generally annular core or frame. Although eight winding coils 43 are seen in FIG. 5B, the number of windings 43 can vary from one model of motor to another, with there being a minimum number of coils. The stator winding assembly 41 is characterized by a stator stack length $L_s$ defined by its ion core, and is also characterized by an inner diameter $ID_s$ of a central region into which a rotor assembly fits. A winding insulator 45 is used at the ends of the stator core to support the windings 43 where they make a turn and to prevent the stator's windings from shorting to the stator's iron core. Being nonmagnetic, the winding insulator serves only as a support frame and is not counted as part of the stator's stack length $L_s$.

A rotor assembly includes a rotor stack 47 of permanent magnets with a rotor stack length $L_r$, an axial drive shaft 49, and bearings 51 and 52. The rotor assembly has an outer diameter that is slightly less than the inner diameter of the stator assembly so that the rotor fits within the stator with a small air gap 53 therebetween that allows the rotor to freely rotate on its bearings 51 and 52 about its drive axis A.

A pair of end caps 55 and 56 are provided that fit over the ends of the stator winding assembly 41. There is a central opening 57 in at least one of the end caps 55 (or both end caps as shown here) through which the drive shaft 49 projects. A space is also provided in the end caps 55 and 56 to seat the rotor assembly at its bearings 51 and 52. Outside of that space for the bearings is an annular elevated region 65 that is used to seat the end caps 55 and 56 in the correct position relative to the stator winding assembly 41 by means of rings 61 and 62.

Figure 1:
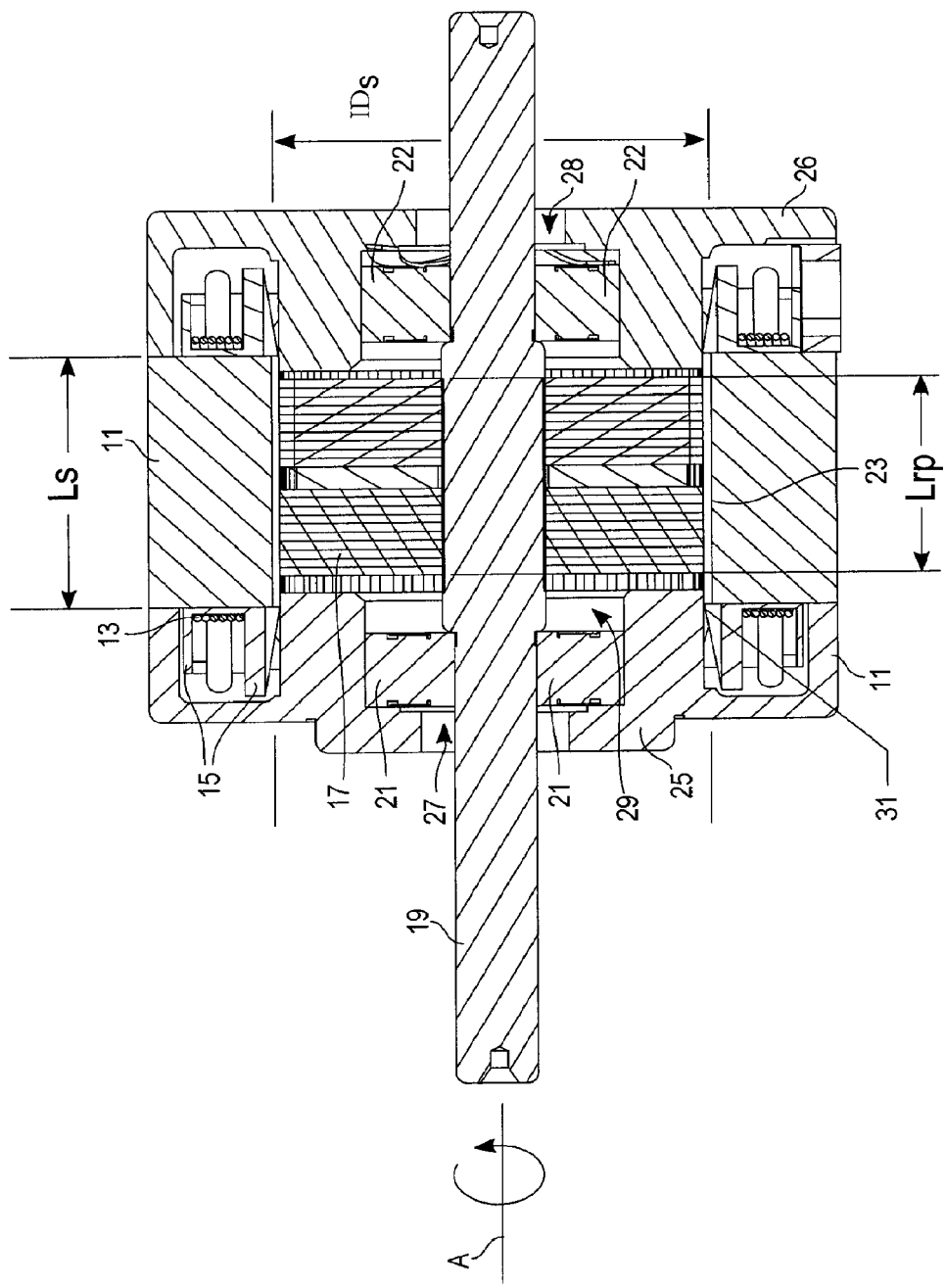
FIG. 1 is a side sectional view of a motor according to the prior art.
Figure 2:
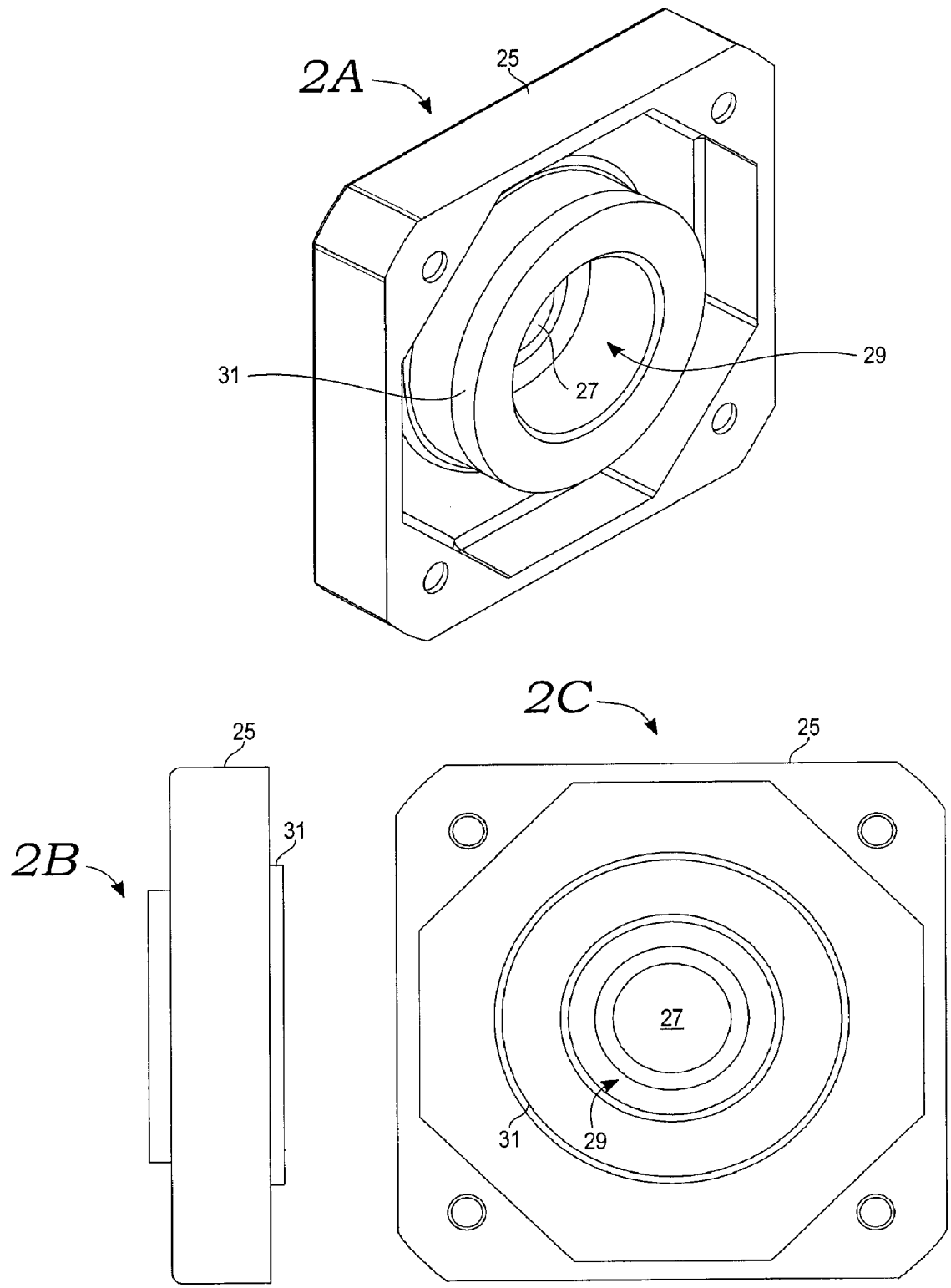
FIGS. 2A-2C are perspective, side and plan views, respectively, of an end cap for the motor of FIG. 1.
Figure 4A:
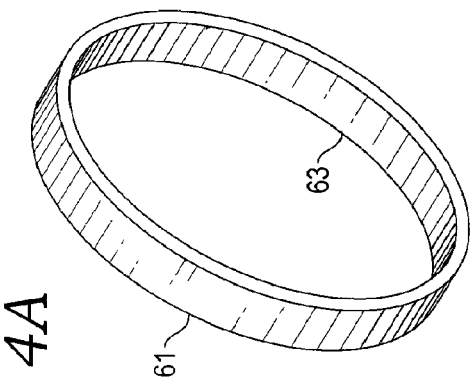
FIGS. 4A and 4B are perspective and plan views, respectively, of a guide ring for the motor embodiment of FIG. 3.
Figure 4B:
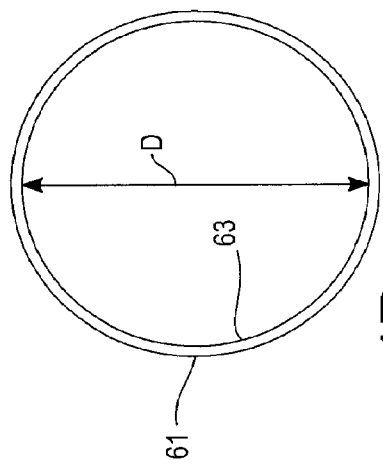

The stator stack length $L_s$ is equal to the corresponding rotor stack length $L_r$. In order that the end caps 55 and 56 can pilot into the correct position relative to the inner diameter $ID_s$ of the stator winding assembly, a pair of end cap positioning rings 61 and 62 is provided (a ring 61 is seen also in FIGS. 4A and 4B in isolation; ring 62 is identical). The rings 61 and 62 have an inner diameter D substantially equal to the inner diameter $ID_s$ of the stator winding assembly 41 within a specified tolerance. The ring inner diameter must at least be large enough that the rotor assembly can fit through one of the rings into the central region within the stator assembly. The rings can be made of any material (metal or plastic) and fit within the winding insulator 45 at the respective ends of the stator winding assembly 41 (as seen in FIGS. 5A and 5B with the end caps and rotor assembly removed), so that the inner surfaces 63 of the rings 61 and 62 substantially coincide with the inner diameter of the stator winding assembly 41 within a specified tolerance. These rings 61 and 62 are installed on the stator assembly 41 after winding process for the stator coils has been completed.

Each end cap 55 or 56 has an annular elevated region 65 that fits snuggly into one of the rings 61 and 62, thereby properly centering each end caps 55 or 56 and the rotor assembly seated by the end caps 55 and 56. The end caps 55 and 56 pilot on the rings 61 and 62 instead of the stator winding assembly. This guarantees that the rotor assembly will be in a concentric position relative to the stator. The end cap 85 seen in FIGS. 7A-7C is structurally same as the end cap 55 and 56 in FIG. 3. When seated the end caps 55 and 56 are adhesively bonded to the stator assembly 41.

Figure 6:
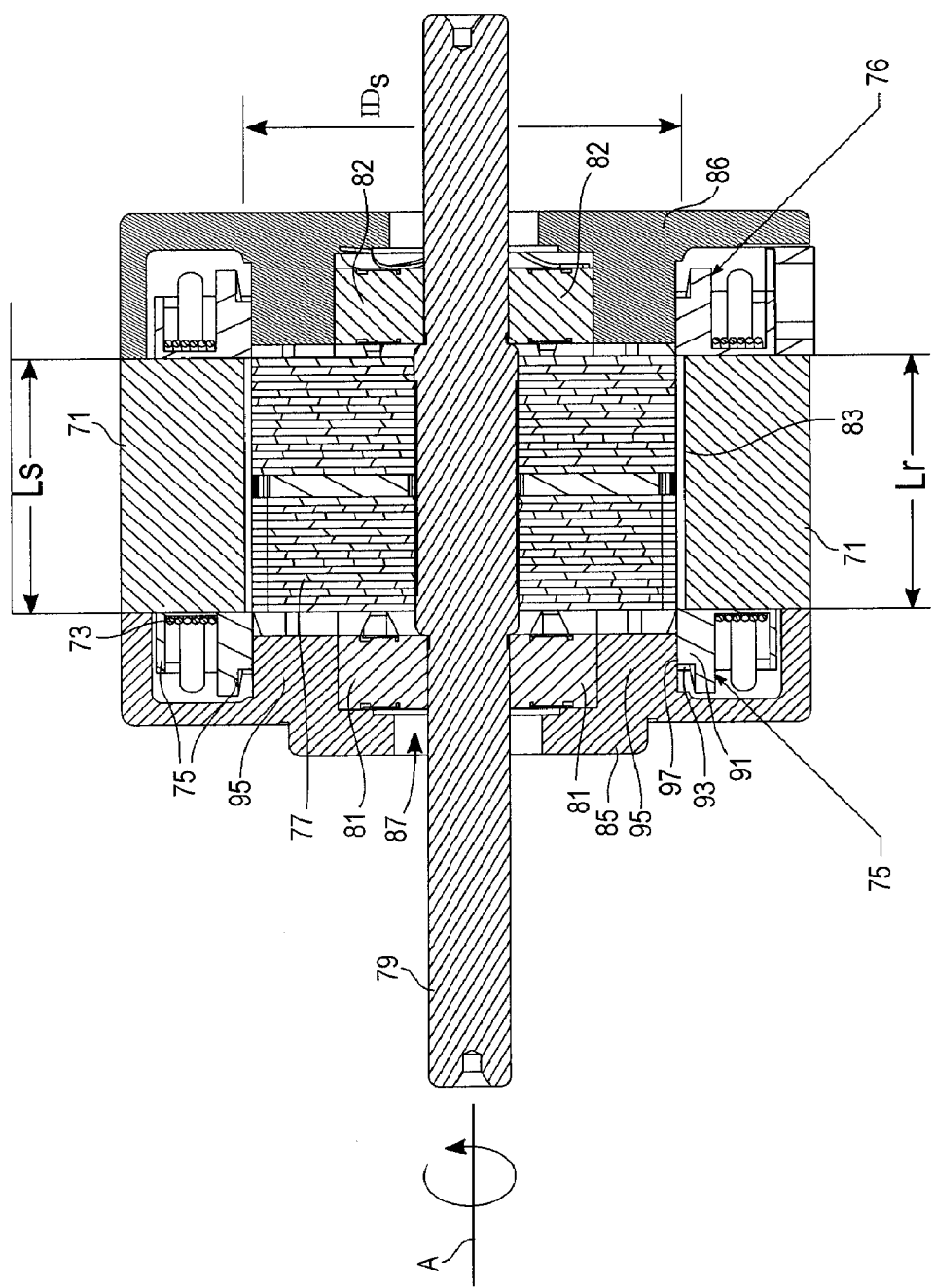
FIG. 6 is a side sectional view of a motor according to a second embodiment of the invention.

With reference to FIG. 6, a second embodiment of a motor 70 in accord with the present invention includes a stator winding assembly 71 with conductive windings 73, which define a set of coils for some predefined number of electromagnetic poles, all wound around a generally annular core or frame. The stator winding assembly 71 is characterized by a stator stack length $L_s$ and also by an inner diameter $ID_s$ of a central region into which a rotor assembly fits. An insulator 75 is used to prevent the stator's windings from shorting. A rotor assembly includes a rotor stack 77 of permanent magnets with a rotor stack length $L_r$, an axial drive shaft 79, and bearings 81 and 82. The rotor assembly has an outer diameter that is slightly less than the inner diameter of the stator assembly so that the rotor fits within the stator with a small air gap 83 therebetween that allows the rotor to freely rotate on its bearings 81 and 82 about its drive axis A. A pair of end caps 85 and 86 are provided that fit over the ends of the stator winding assembly 71. There is a central opening 87 in at least one of the end caps 85 (or both end caps as shown here) through which the drive shaft 79 projects. A space is also provided in the end caps 85 and 86 to seat the rotor assembly at its respective bearings 81 and 82. Outside of that space for the bearings is an annular elevated region 95 that is used to seat the end caps 85 and 86 in the correct position relative to the stator winding assembly 71.

The stator stack length $L_s$ is equal to the corresponding rotor stack length $L_r$. In order that each end cap 85 or 86 can pilot into the correct position relative to the inner diameter $ID_s$ of the stator winding assembly, the winding insulator 75 (seen in FIGS. 8A and 8B in isolation) has a set of guide segments 91 integrated therein. The number of guide segments 91 may vary, but a minimum of three are required, preferably distributed around the winding insulator 75. The guide segments 91 outline a cylindrical inner diameter D substantially equal to the inner diameter $ID_s$ of the stator winding assembly 71 within a specified tolerance, replacing the rings 61 and 62 of the first embodiment. The outlined cylindrical inner diameter defined by the guide segments 91 must at least be large enough that the rotor assembly can fit past the guide segments 91 into the central region within the stator assembly 71. The guide segments 91 form parts of the ends of the winding insulator 75, so that the inner surfaces 93 of the guide segments 91 substantially coincide with the inner diameter of the stator winding assembly 71 within a specified tolerance. The guide segments 91 cannot form a complete ring on the winding insulator 75, since spaces are needed between the stator poles for the winding needle to pass through during the winding process, but not all winding poles need have an associated winding segment.

As seen in FIGS. 7A-7C, each end cap 85 and 86 has an annular elevated region 95 that fits snuggly with its outer surface 97 in contact with the inner surfaces 93 of the guide segments 91, thereby properly centering the end caps 85 and 86, and the rotor assembly seated by end cap 85. This guarantees that the rotor assembly will be in a concentric position relative to the stator. The end caps 85 and 86 are adhered to the stator assembly 71.

The present invention takes advantage of the presence of the winding insulator 45 or 75 attached to the ends of the stator winding assembly 41 or 71, by providing a ring 61 or integrated guide segments 91 for positioning the end caps 55 or 85 without lengthening the stator stack length $L_s$. The stator can be the same length as the rotor, thus reducing overall motor length while maintaining motor torque.

What is claimed is:

1. A motor, comprising:
    a stator winding assembly characterized by an inner diameter;
    a rotor assembly having a rotor, a drive shaft and bearings, the rotor assembly fitting so as to rotate within the stator winding assembly, the rotor assembly having a stack length equal to that of the stator winding assembly;
    a pair of end caps fitting over ends of the stator winding assembly, the end caps seating the rotor assembly at its bearings, with at least one end cap having a central opening through which the drive shaft projects; and
    a set of guides, distinct from the end caps, attached at respective ends of the stator winding assembly and having dimensions coinciding with the inner diameter of the stator winding assembly to pilot the placement of the end caps such that the rotor assembly is indirectly maintained in a concentric position relative to the stator winding assembly.

2. The motor as in claim 1, wherein the set of guides comprises a pair of rings having an inner diameter equal to that of the stator winding assembly, the pair of rings attached at opposite ends of and concentric with the stator winding assembly such that the inner diameters of rings and stator winding assembly coincide.

3. The motor as in claim 2, wherein the pair of rings are attached to a winding insulator of the stator winding assembly.

4. A motor, comprising:
    a stator winding assembly characterized by an inner diameter;
    a rotor assembly having a rotor, a drive shaft and bearings, the rotor assembly fitting so as to rotate within the stator winding assembly, the rotor assembly having a stack length equal to that of the stator winding assembly;
    a pair of end caps fitting over ends of the stator winding assembly, the end caps seating the rotor assembly at its bearings, with at least one end cap having a central opening through which the drive shaft projects; and a set of guides attached at respective ends of the stator winding assembly and having dimensions coinciding with the inner diameter of the stator winding assembly to pilot the placement of the end caps such that the rotor assembly is maintained in a concentric position relative to the stator winding assembly, wherein the set of guides comprises a winding insulator for the stator winding assembly, the winding insulator having integrated therein a set of three or more guide segments outlining a cylindrical inner surface interrupted by regular spaces between stator pole locations for winding needle passage, the cylindrical inner surface having an inner diameter equal to that of the stator winding assembly.

* * * * *